(12) United States Patent
Herman et al.

(10) Patent No.: US 6,883,126 B1
(45) Date of Patent: Apr. 19, 2005

(54) METHOD AND APPARATUS FOR REDUCING ERROR RECOVERY TIME IN HARD DISK DRIVE

(75) Inventors: Lace J. Herman, Boulder, CO (US); Jerry Moline, Denver, CO (US)

(73) Assignee: Maxtor Corporation, Longmont, CO (US)

( * ) Notice: Subject to any disclaimer, the term of this patent is extended or adjusted under 35 U.S.C. 154(b) by 352 days.

(21) Appl. No.: 10/008,329

(22) Filed: Nov. 7, 2001

Related U.S. Application Data

(60) Provisional application No. 60/246,383, filed on Nov. 7, 2000.

(51) Int. Cl.[7] .............................................. G01C 29/00
(52) U.S. Cl. ...................................... 714/723; 714/769
(58) Field of Search ................................ 714/723, 724, 714/746, 758, 5, 769; 360/53, 31, 48

(56) References Cited

U.S. PATENT DOCUMENTS 5,812,752 A * 9/1998 Yamada .......................... 714/5
6,147,827 A    11/2000 Southerland et al. ......... 360/53

* cited by examiner

Primary Examiner—Guy J Lamarre
Assistant Examiner—James C. Kerveros
(74) Attorney, Agent, or Firm—Tejpal S. Hansra

(57) ABSTRACT

An adaptive error recovery routine allows for the recovery from errors in read data of a disk drive. In one embodiment, a disk drive is provided which has an error memory having error memory elements used to record an error type and recovery step for each error recovered from the disk drive. If another error is detected that is of the same type and which is in a location close to a recorded error, the error recovery step used for the previous error is performed for the new error. If the previous error recovery step is not successful, the disk drive performs error recovery using an existing error recovery table, and omits the previous error recovery step.

39 Claims, 5 Drawing Sheets

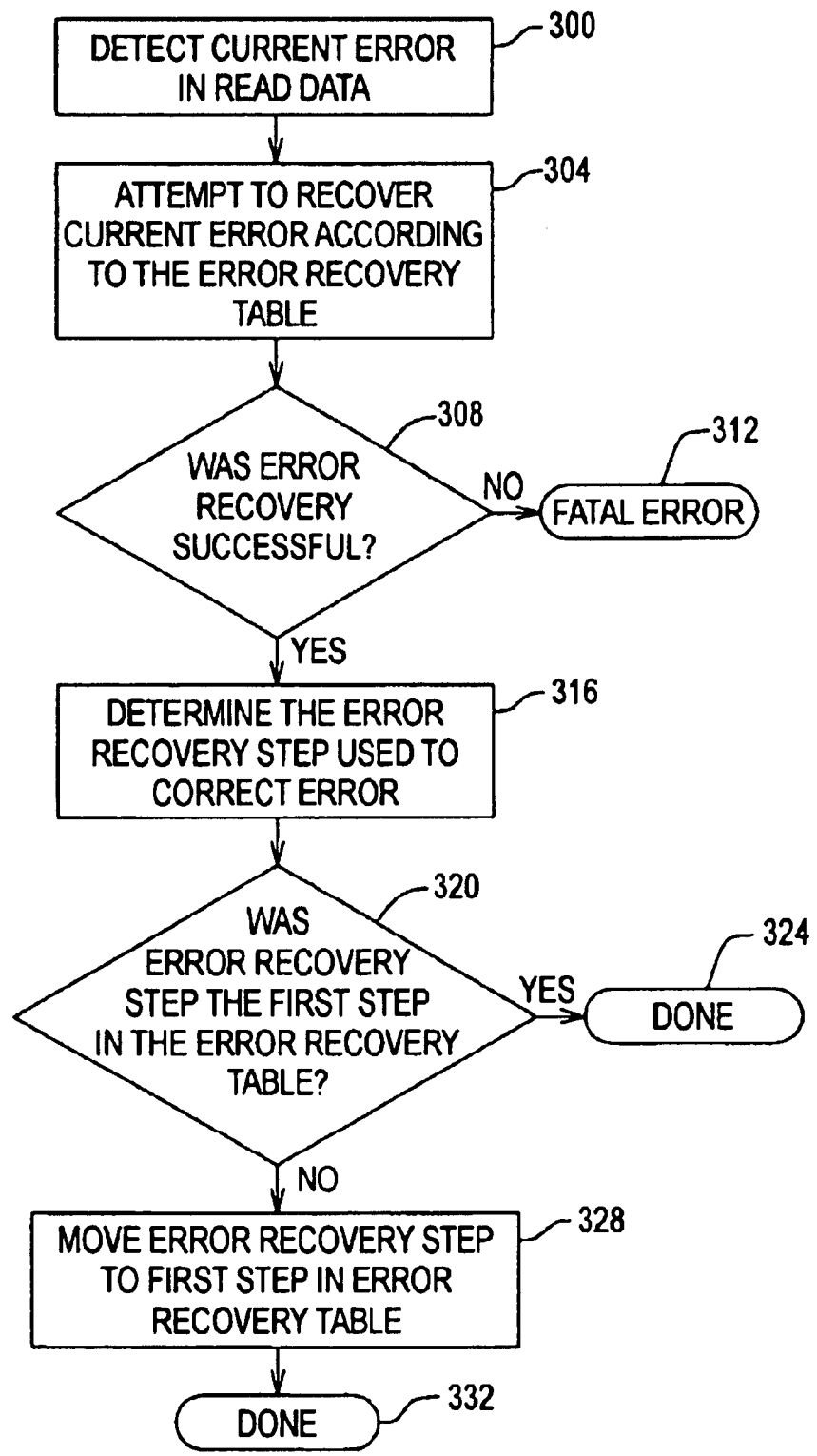

METHOD AND APPARATUS FOR REDUCING ERROR RECOVERY TIME IN HARD DISK DRIVE

Priority is claimed from U.S. Provisional Patent Application No. 60/246,383, filed Nov. 7, 2000 entitled "Adaptive Error Recovery," which is incorporated by reference in its entirety.

FIELD OF THE INVENTION

The invention relates generally to digital data storage systems and, more particularly, to recovery from data errors in such systems. The invention is particularly applicable in magnetic data storage systems.

BACKGROUND OF THE INVENTION

A disk drive is a digital data storage device that stores digital information within concentric tracks on a storage disk. In magnetic disk drive systems, the storage disk is coated with a magnetic material that is capable of changing its magnetic orientation in response to an applied magnetic field. During operation of a disk drive, the disk is rotated about a central axis at a substantially constant rate. To read data from or write to the disk, a magnetic transducer is centered above a desired track of the disk while the disk is spinning. Writing is performed by delivering a write signal having a variable current to the transducer while the transducer is held close to the spinning track. The write signal creates a variable magnetic field at a gap portion of the transducer that induces magnetic polarity transitions into the desired track which are representative of the data being stored.

Reading is performed by sensing the magnetic polarity transitions on the rotating track with the transducer. As the disk spins below the transducer, the magnetic polarity transitions on the track present a varying magnetic field to the transducer. The transducer converts the varying magnetic field into an analog read signal that is then delivered to a read channel for appropriate processing. The read channel converts the analog read signal into a properly timed digital signal that can be recognized by a host computer system.

The transducer can include a single element, such as an inductive read/write element, for use in both reading or writing, or it can include separate read and write elements. Transducers that include separate elements for reading and writing are known as "dual element heads" and usually include a magnetoresistive (MR) read element for performing the read function. Dual element heads are advantageous because each element of the transducer can be optimized to perform its particular function. For example, MR read elements are more sensitive to small variable magnetic fields than are inductive heads and thus can read much fainter signals from the disk surface. MR elements, however, are not capable of writing to the disk surface. Because MR elements are more sensitive, data can be more densely packed on the surface of the disk.

There are many variables that can affect the read performance of a magnetic disk drive. One of the variables, for example, is the flying height of the transducer above the disk surface during the write operation which wrote the data to the disk surface. If the transducer is not within a specific flying height range during the write operation, the number of read errors increases significantly. These type of read errors are commonly referred to as high fly write errors. Another variable that affects read performance is the strength and position of the magnetic polarity transitions on the surface of the disk. If the transitions are weak or the data is not properly "centered" on the track, then the signal to noise ratio (SNR) of the analog read signal will be correspondingly low and poor read performance may result. These type of errors are commonly referred to as track misregistration (TMR) or offtrack errors. Another variable that can affect the read performance of the disk drive is the presence of foreign particles or other aberrations on the surface of the disk that modulate the analog read signal when passed by the transducer. Signal distortions created by such particles are known as thermal asperities. Other types of errors may also be present, which are well understood by those of skill in the art.

Disk drives typically have error recovery routines which can help a drive to recover from errors (e.g., those errors mentioned above) and to read data from the disk surface. The type of error recovery routine used for recovering data will depend upon the type of error present. Generally, when recovering errors, a disk drive will follow a preset error recovery table. This error recovery table contains error recovery steps which are often successful at recovering particular errors. Upon detection of an error, the disk drive enters an error recovery routine, where the error recovery steps are initiated in a preset order contained in the error recovery table. If an error recovery step is not successful in recovering the error, the disk drive will move to the next error recovery step in the error recovery table and attempt to recover the error according to that step. This continues until either the error is recovered, there are no more steps in the error recovery table, or until the host reaches a time limit for receiving the data. When the host reaches this time limit, the disk drive will receive notification and discontinue error recovery.

For example, the error recovery table may contain an entry for a high fly write error as the first error recovery step in the error recovery table. The disk drive, upon detecting an error, will enter the error recovery routine, and try this error recovery step first. If the high fly write error recovery step is successful in recovering the data, the disk drive exits the error recovery routine, delivers the data, and continues on as normal. If the high fly write error recovery step was not successful, the next error recovery step in the error recovery table would be attempted. As mentioned above, this continues until the error is recovered, or until a maximum retry limit is reached which corresponds to the number of entries in the error recovery table. The error recovery table typically contains more entries than can be attempted before the host will reach a time limit for receiving the data. However, if all of the error recovery steps in the error recovery table are attempted with no successful recovery, the disk drive will report a fatal error.

The error recovery table is typically generated such that the most common error in a population of disk drives will be the first error recovery step attempted. Likewise, the second most common error in the population of disk drives will be the second error recovery step, and so on. This order of error recovery steps in the error recovery table is preset, and disk drives follow the preset order when doing an error recovery routine. As is understood in the art, when attempting to recover from an error, an error recovery step requires the disk to rotate a full revolution, and the data is attempted to be read using the error recovery step. If an error recovery step is not successful, the disk drive moves to the next error recovery step in the error recovery table, waits for the beginning of a revolution of the disk, and attempts to recover the error using the next error recovery step. Thus, the time required to reach a step in the table increases the further down the table the error recovery routine needs to go to recover an error. Increased time to recover from an error reduces the amount of data that is delivered from the disk drive, thus reducing the transfer rate of a disk drive compared to a disk drive which has fewer errors, or has a reduced time to recover from errors. As will be understood, an important performance factor in disk drives is the transfer rate of the drive. Thus, it would be beneficial to reduce error recovery time.

The order of error recovery steps in an error recovery table is typically derived from extensive testing of a sample population of disk drives, and may be adjusted as more drives are produced when a different order of error frequency develops. Thus, for drives which are typical of the population of disk drives, the time to recover from an error is reduced because the most common errors encountered in the population are the first error recovery steps attempted by the disk drive. This testing of disk drives to determine the order of error recovery steps in an error recovery table can take a significant amount of resources to complete. Thus, it would be beneficial to reduce the amount of resources required to enhance the error recovery routine.

Even with an error recovery routine which first attempts to recover common errors with respect to the population of disk drives, the error recovery routine may not be enhanced for certain drives. This is because some disk drives are outliers with respect to the rest of the population. These outlier drives do not share the same error occurrence frequency as the rest of the population, which results in increased error recovery time as compared to a disk drive that is typical of the population of disk drives. These outlier drives may have a relatively large amount of errors not typically encountered by the population of disk drives in general because a number of factors, such as non-uniformity in the magnetic media. These types of read errors can generally be recovered, although the error recovery step which can recover the error may be relatively far down the error recovery table. Thus, the error recovery table which is used for the entire population of disk drives may not be as efficient for these outlier drives, which can result in increased time to recover from errors.

Furthermore, as the bits per inch (BPI) and tracks per inch (TPI) increase on hard disk drives, error recovery becomes less predictable, because these localized areas of non-uniformity in the magnetic media have a more significant impact on the read signal. This traditionally has been compensated for by requiring tighter design limits on the distribution of materials which are used for the magnetic media. However, these design limits are becoming more difficult to control, and the material distribution in the magnetic media is playing an increased role in determining the frequency and type of error which occurs in an individual drive. These factors result in many more disk drives being outliers with respect to the population of disk drives. Accordingly, it would be advantageous to have an enhanced error recovery routine for outlier drives.

Furthermore, many original equipment manufacturers (OEMs) which incorporate disk drives into their product are requiring tighter performance standards for disk drives. This often results in OEMs rejecting disk drives which have a relatively low transfer rate. Low transfer rates are often the result of increased error recovery time within the disk drive. In many cases, increased error recovery time is a result of the drive having to perform many steps in the error recovery table before getting to the error recovery step which recovers the error. This often happens because a portion of the disk surface has a non-uniformity magnetic media, which is magnified as the BPI and TPI increase. Thus, it would be advantageous to have an error recovery routine which can improve transfer rates so that OEM performance standards may be met by more drives.

Accordingly, it would be advantageous to have an error recovery scheme which can (1) reduce the amount of time required to enhance the error recovery routine, (2) reduce the error recovery time for disk drives which are outliers with respect to the rest of the population, and (3) improve the transfer rate of a disk drive.

SUMMARY OF THE INVENTION

The present invention solves the aforementioned problems and meets the aforementioned, and other, needs. In one embodiment, the invention provides an adaptive error recovery routine for a disk drive which attempts an error recovery step which has an increased probability of recovering an error depending upon previous errors recovered from the disk drive. In one embodiment, the disk drive determines the location of the error, and attempts a first recovery step based on successful recoveries of an error (or errors) from the same vicinity as the detected error. In another embodiment, the disk drive re-orders the error recovery table based on errors recovered from the disk drive as a whole. In yet another embodiment, the disk drive weights error recovery steps in an error recovery table to increase the weight of an error recovery step most likely to recover the error and decrease the weight of an error recovery step less likely to recover the error.

Additional features and other embodiments of the present invention will become apparent from the following discussion, particularly when taken together with the accompanying drawings.

BRIEF DESCRIPTION OF THE DRAWINGS

FIG. 6 is a flow chart diagram illustrating an adaptive error recovery operation of another embodiment of the present invention.

DETAILED DESCRIPTION

Figure 1:
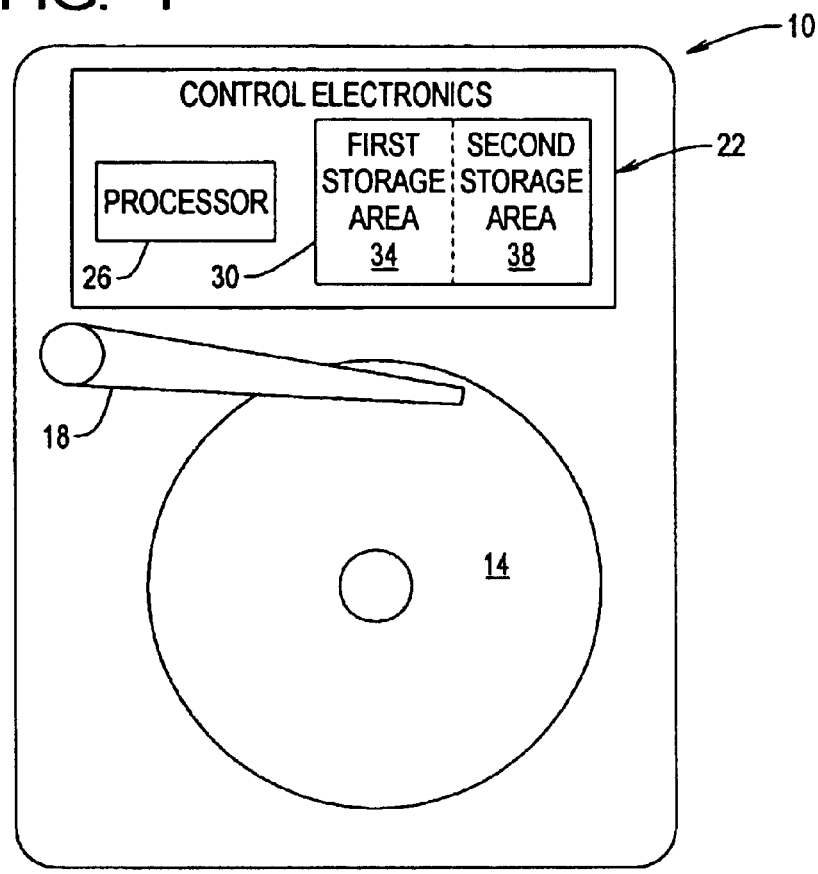
FIG. 1 is a diagrammatic representation illustrating a disk drive of one embodiment of the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

FIG. 1 is a block diagram illustrating certain components of a hard disk drive that may be used in connection with the present invention. The hard disk drive 10 includes a magnetic disk 14, an actuator arm 18, and control electronics 22. Within the control electronics 22 are a processor 26 and a memory 30. It will be understood that the processor 26 and memory 30 may be integrated on a single chip, and that, likewise, multiple processors 26 and memories 30 may be present within the control electronics 22. Within the memory 30 is a first storage area 34 which can store data required for operation of the disk drive, and a second storage area 38 which can be used as an error memory to store information regarding past errors found and recovered in the disk drive. In one embodiment, the second storage area 38 contains a number of memory elements, with each memory element containing information on an error and a recovery step that was successful in recovering the error.

Figure 2:
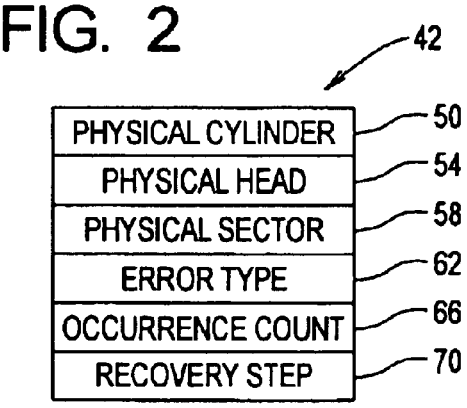
FIG. 2 is a block diagram representation illustrating a structure of an error memory element of one embodiment of the present invention.

Referring now to FIG. 2, a physical description of a memory element is now described. In this embodiment, each memory element 42 contains six (6) entries. The first entry 50 contains information on the physical cylinder of the error that was corrected. The second entry 54 contains information on the physical head which detected the error. The third entry 58 contains information on the physical sector the error was located in. The fourth entry 62 contains information on the error type. The fifth entry 66 has information on the occurrence count, that is, the number of times that this error has been detected within a preset vicinity from the location contained in the first three entries 50, 54, 58. The sixth entry 70 contains the error recovery step from the error recovery table which was used to recover the error. In one embodiment, the size of the first entry 50 is two words, and the second through sixth entries 54-70 are one word each. This gives a total size of 7 words (14 bytes) for a memory element 42 in this embodiment.

It will be understood that the memory element 42 described above with respect to FIG. 2 is one embodiment of an error memory element which may be used to achieve the adaptive error recovery of the present invention. Numerous variations related to the order of the data entries, information contained in the data entries, and format of the memory element and information stored therein will be readily recognized by one skilled in the art. For example, age data may be stored instead of the number of occurrences. Furthermore, both age data and an occurrence count may be stored in the memory element.

Figure 3:
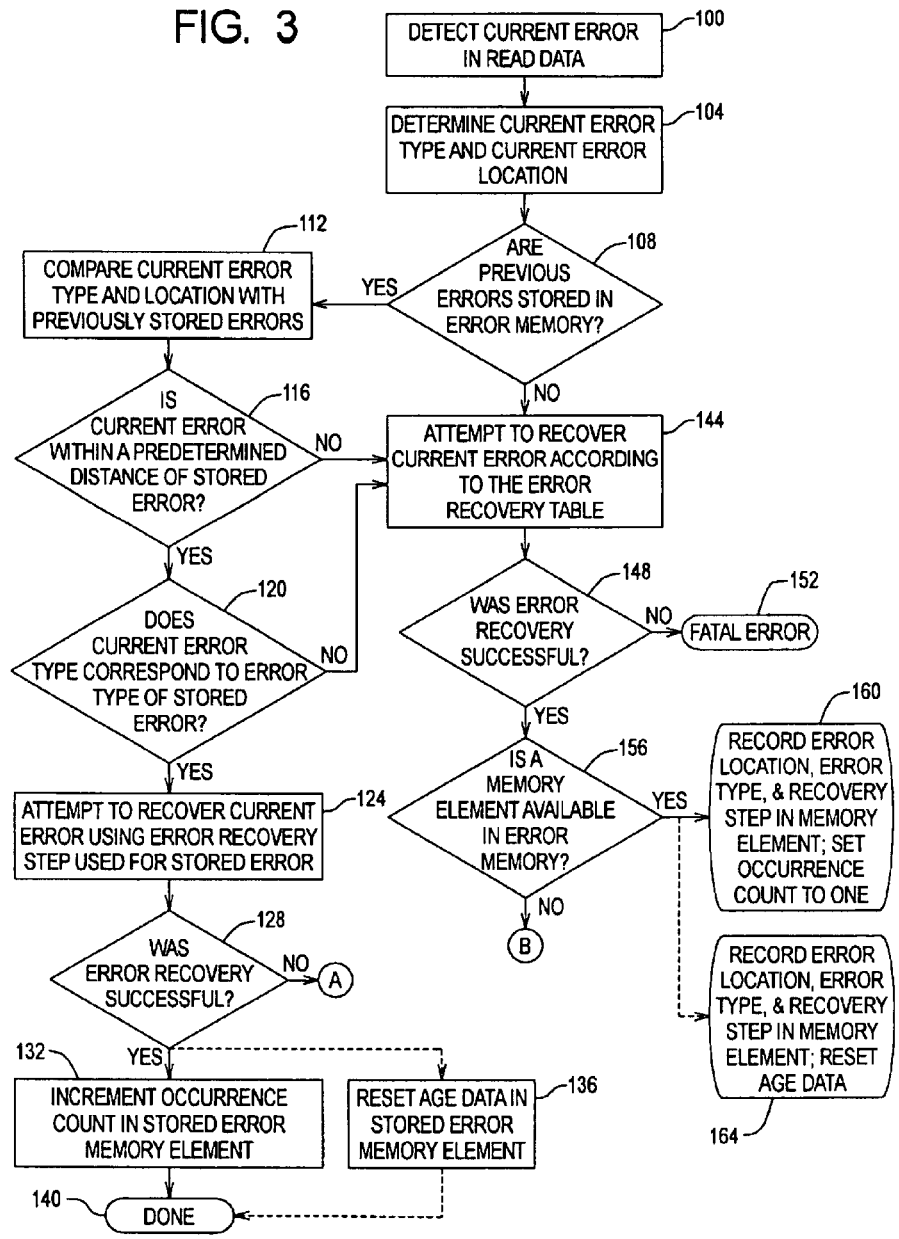
FIG. 3 is a flow chart diagram illustrating adaptive error recovery operation of one embodiment of the present invention.

Referring now to FIG. 3, a flow chart illustrating the operation of one embodiment of the invention is now described. In this embodiment, when an error is detected, the processor first determines if a similar error has occurred in a similar location, and attempts an error recovery step based on this determination. Initially, as indicated by block 100, the disk drive detects an error in the read data. Next, at block 104, the disk drive determines the location of the error. The location, in this embodiment, includes the cylinder, head, and sector. Next, at block 108, the disk drive determines if any previous errors are stored in the error memory. If previous errors are stored in error memory, the disk drive then compares the location of the error and the error type to the recorded errors in the error memory, as indicated by block 112. The disk drive, at block 116, determines if the current error is within a predetermined distance of a stored error. In one embodiment, the current error is considered to be within the predetermined distance of a stored error if they are located on the same cylinder and head, and within 100 sectors of each other. In another embodiment, the current error is considered to be within the predetermined distance of a stored error if they are located on the same head and same cylinder. In yet another embodiment, the current error is considered to be within the predetermined distance of a stored error if they are located on the same head and are within 10 cylinders of each other.

If at block 116 the error is within the predetermined distance of a stored error, the disk drive then determines at block 120 whether the current error type corresponds to the error type of the stored error. The error type is the type of read error detected by the read channel in response to the analog read signal. In one embodiment, the current error maps to the errors already stored in error memory when there is either a direct match, or the errors are commonly identified by the read channel as the same error. For example, an ECC error is commonly identified by the read channel as either an ECC error, or a thermal asperity (TA) error. In this case, if the error stored in the memory element is an ECC error and if the current error is identified as an ECC error or a TA error, the disk drive will consider the errors to match. Likewise, if the error type stored in the memory element is a TA error, the disk drive will consider the errors to match when the current error is identified as either a TA error or an ECC error. Likewise, similar situations may exist for other error types as will be understood by one skilled in the art.

If the disk drive determines at block 120 that the current error type corresponds to the error type stored in the memory element, the disk drive then, at block 124 attempts to recover the current error using the error recovery step used for the stored error. The disk drive then determines whether the error recovery was successful, as noted by block 128. If the error recovery was not successful, the disk drive then performs the steps associated with flow chart A, as will be discussed below. If the error recovery was successful, the disk drive increments the occurrence count stored in the memory element, as noted by block 132. Alternatively, as indicated by the dashed lines of FIG. 3, following a successful error recovery at block 128, the disk drive updates age data stored in the memory element, as noted by block 136. Age data, in one embodiment, is a record of the running time of the disk drive. In this embodiment, a disk drive keeps on running time, in milliseconds, since the drive was powered on, which is stored in the memory element. Following either of blocks 132 or 136, the error recovery routine is complete, as indicated by block 140, and the disk drive returns to normal operation.

If, at block 108, the disk drive determines that there are no existing memory elements with stored errors, the disk drive attempts to recover the current error according to the error recovery table, as noted by block 144. Likewise, if the disk drive determines at block 116 or block 120 that the current error is not within a predetermined distance of a stored error or the current error type does not correspond to the error type of the stored error, the disk drive attempts to recover the current error according to the error recovery table, as noted by block 144. Next, at block 148, the disk drive determines if error recovery using the error recovery table was successful. If error recovery using the error recovery table was not successful, the disk drive reports a fatal error, as noted by block 152. If the error recovery was successful, the disk drive determines if a memory element is available in error memory to store information related to the error and the error recovery step, as noted by block 156. If a memory element is available, the disk drive records the error location, error type, and recovery step in an available memory element, and sets the occurrence count in the memory element to one, as indicated by block 160. Alternatively, as illustrated by the dashed lines in FIG. 3, following a determination that a memory element is available the disk drive records the error location, error type, and recovery step in an available memory element, along with age data, as indicated by block 164. If a memory element is not available, the disk drive, following block 156, performs the steps associated with flow chart B, as will be discussed below.

Figure 4:
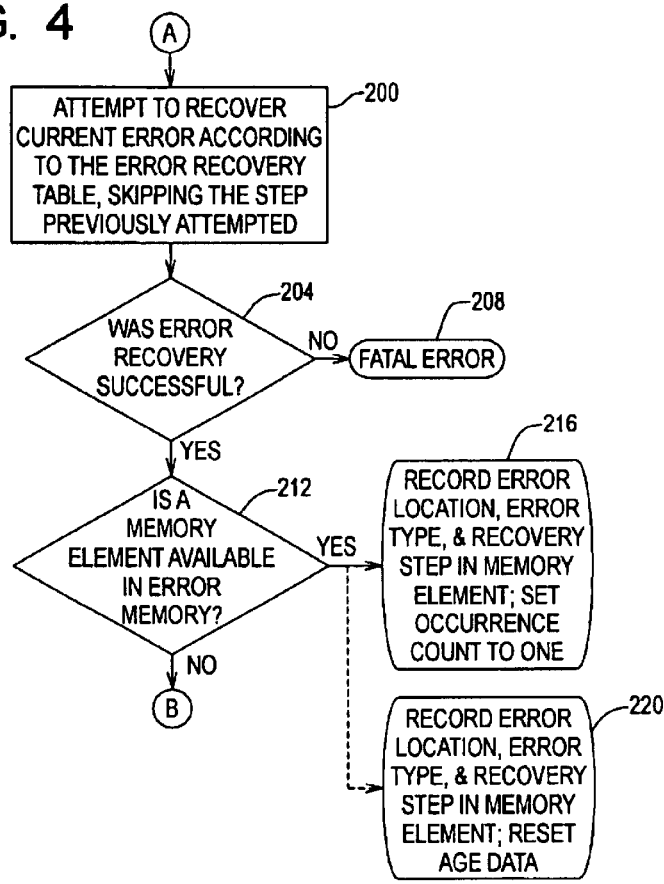
FIG. 4 is a flow chart diagram illustrating two embodiments for an error recovery operation when a first error recovery step based on a previous error has failed.

Referring now to the flow chart illustration of FIG. 4, the steps a disk drive performs with respect to flow chart A are now described. As mentioned above with respect to FIG. 3, following an unsuccessful error recovery in block 128, the disk drive performs the steps associated with flow chart A.

Initially, upon starting the routine associated with flow chart A, the disk drive attempts to recover the current error according to the error recovery table, skipping the error recovery step previously attempted, according to block 200. The disk drive then determines if the error recovery was successful, as noted by block 204. If error recovery using the error recovery table was not successful, the disk drive reports a fatal error, as indicated by block 208. If error recovery using the error recovery table was successful, the disk drive determines if a memory element is available in error memory to store information related to the error and recovery step, as noted by block 212. If a memory element is available, the disk drive records the error location, error type, and recovery step in an available memory element, and sets the occurrence count in the memory element to one, as indicated by block 216. Alternatively, as illustrated by the dashed lines in FIG. 4, following a determination that a memory element is available the disk drive records the error location, error type, and recovery step in an available memory element, along with age data, as indicated by block 220. In one embodiment, the age data is the running time of the disk drive. If a memory element is not available, the disk drive, following block 212, performs the steps associated with flow chart B, as will be discussed below.

Figure 5A:
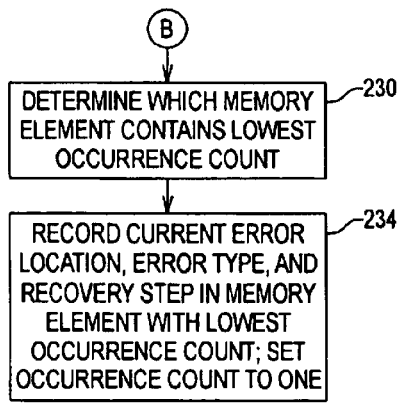
FIG. 5a is a flow chart diagram illustrating the selection of a memory element for storing data associated with an error and error recovery step for one embodiment of the present invention.
Figure 5B:
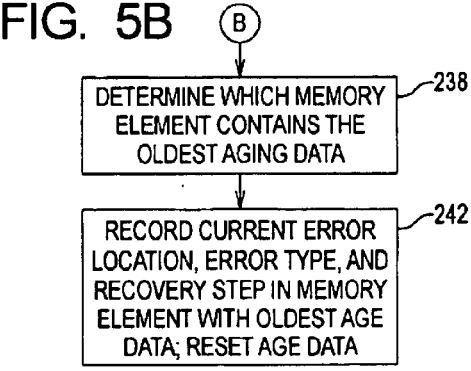
FIG. 5b is a flow chart diagram illustrating the selection of a memory element for storing data associated with an error and error recovery step for one embodiment of the present invention.

FIG. 5*a*, illustrates one embodiment for determining a memory element to replace when all of the available memory elements are used and a new error is to be stored in a memory element. In this embodiment, when the disk drive initiates the steps associated with flow chart B, the disk drive initially makes a determination to find which memory element contains the lowest occurrence count, as noted by block 230. The disk drive then records the error location, error type and recovery step in the memory element with the lowest occurrence count, and resets the occurrence count for that memory element to one, as noted by block 234. Alternatively, as described with respect to the dashed lines in FIGS. 3 and 4, aging data may be stored in the memory elements. In such a case, the aging data is used to determine which memory element is to be used to record error information. In this embodiment, as illustrated by the flow chart of FIG. 5*b*, the disk drive determines which memory element contains the oldest age data, as noted by block 238. Upon determining which memory element contains the oldest age data, the disk drive records the error location, error type, and recovery step in the memory element with the oldest age data, and resets the age data, according to block 242.

It will be understood that other embodiments exist for determining which memory element to replace when no additional memory elements are available to store error information, including a scheme which accounts for both age and occurrence count. In such an embodiment, the age and occurrence count would both be recorded, and the product of the two can be used to determine a weight for the element, with the element with the least weight being replaced.

Referring again to FIG. 1, and the flow charts of FIGS. 3–5, the memory elements are stored in the second storage area 38. In one embodiment, the second storage area is RAM memory, and the memory elements which are stored during operation of the disk drive 10 are lost when the disk drive loses power. Thus, when the disk drive 10 is powered up, the second storage area 38 does not have error recovery information stored in its memory elements. In another embodiment, the data stored in the second storage area 38 is periodically saved to a portion of the storage media 14. In this embodiment, the storage media 14 contains a utility cylinder (or utility sectors) used to store information which is used by the disk drive for operating. When the disk drive 10 is powered up, it reads the data from the utility cylinder, and reloads this data into the second storage area 38, thus providing error recovery data to the disk drive. It will be understood that other alternatives are available as well, such as storing the memory elements in a non-volatile RAM memory, or a flash memory. In one embodiment, the second storage area 38 is a flash EPROM located within the control electronics 22. As will be understood by one skilled in the art, numerous options exist for storing memory elements, with the amount of memory and type of memory can be adjusted based on the application.

Referring now to the flow chart illustration of FIG. 6, another alternative embodiment for adapting the error recovery routine is now described. In this embodiment, the error recovery table itself is adjusted. As noted at block 300, the disk drive initially detects an error in the read data. The disk drive next performs an error recovery routine according to the error recovery table, according to block 304. The disk drive then determines if the error was recovered, as noted by block 308. If the error was not recovered by stepping through the error recovery table, the disk drive returns a fatal error, as indicated at block 312. If the error was recovered, the disk drive determines the error recovery step which was successful in recovering the current error, as noted by block 316. The disk drive then, at block 320, determines if the error recovery step was the first step in the error recovery table. If the step was the first step in the error recovery table, the error recovery routine is done, as noted by block 324. If the step which recovered the error was not the first step in the error recovery table, the disk drive re-orders the error recovery table to move the error recovery step which was successful in recovering the current error such that it is the first error recovery step that is attempted during the next error recovery, as noted by block 328. The disk drive then exits the error recovery routine, as noted by block 332.

In the embodiment described above with respect to FIG. 6, the error recovery routine is thus further enhanced as the disk drive operates. In this manner, the most frequent error will move to the top of the error recovery table, and may help to reduce the amount of time required for error recovery in the disk drive. In one embodiment, there is one error recovery table for the entire disk drive. In another embodiment, each disk surface has an error recovery table, thus allowing each disk surface to have a different order for the error recovery table. In yet another embodiment, each data zone on a disk surface has an error recovery table, allowing for each data zone to have its own error recovery step order. The information containing the error recovery table order may be stored in one or more of a number of different data structures. In one embodiment, each error recovery table is an array which contains pointers to an error recovery algorithm that is associated with the error recovery step. These pointers are reordered as necessary within the array. When the disk drive enters the error recovery routine, it steps through the array, performing the error recovery steps as they are ordered in the array.

The error recovery table order of these embodiments can be stored in the second storage area 38, as described above with respect to FIG. 1. When the error recovery table order is stored in the second storage area, it can also be periodically saved to the storage media 14, thus providing the disk drive with a updated error recovery table upon powering up. As mentioned above, multiple error recovery tables may be used, which can also be stored in the second storage area 38, and which can also be saved to the storage media periodically.

Figure 7:
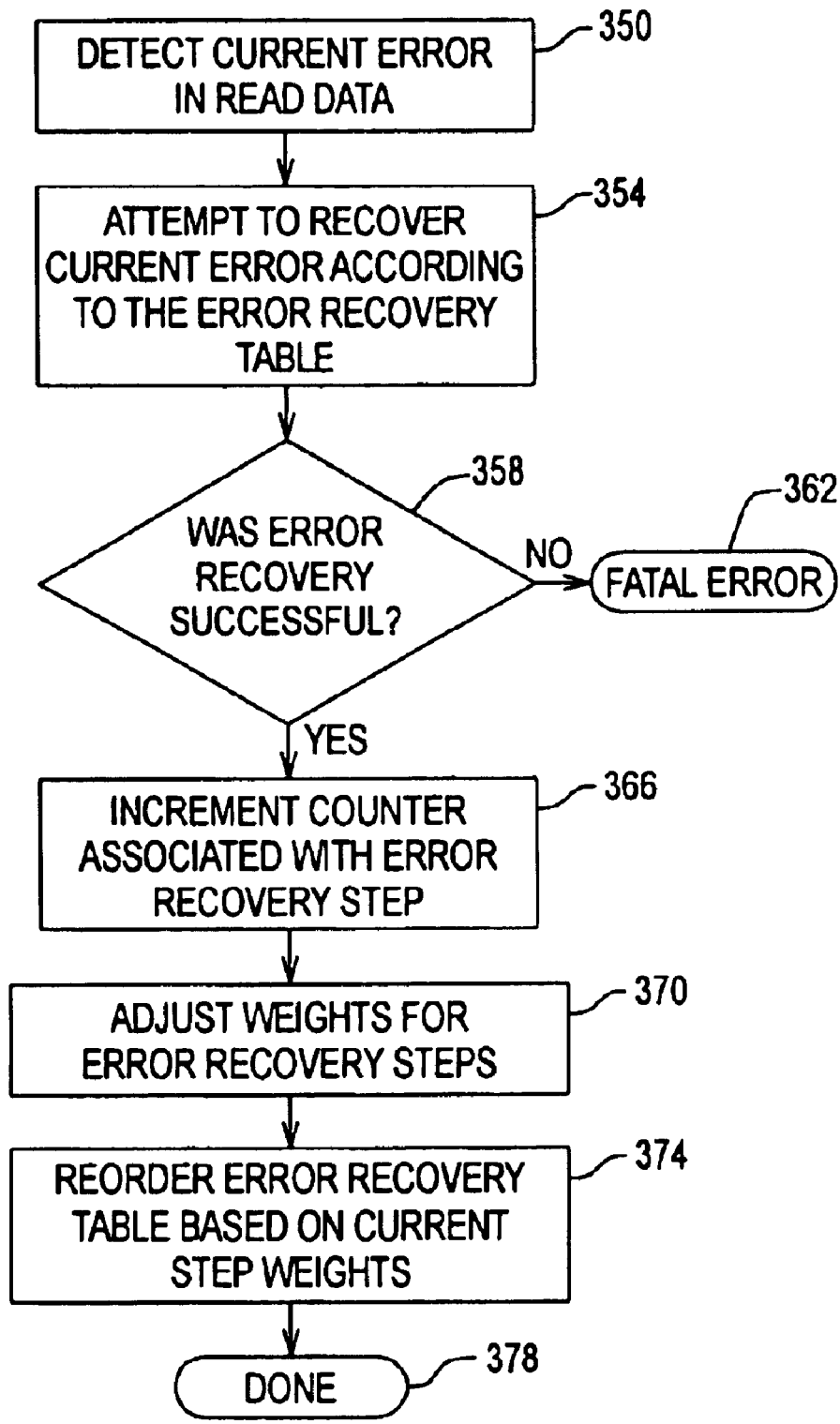
FIG. 7 is a flow chart diagram illustrating an adaptive error recovery operation of another embodiment of the present invention.

Referring now to the flow chart illustration of FIG. 7, another alternative embodiment for adapting the error recovery routine is now described. In this embodiment, the error recovery table is both weighted and adjusted. Initially, the disk drive detects an error in the read data, as noted by block 350. The disk drive then performs the error recovery routine according to the error recovery table, as noted by block 354. The disk drive then determines whether the error recovery using the error recovery table was successful, as indicated by block 358. If the error recovery using the error recovery table was not successful, the disk drive returns a fatal error, according to block 362. If the error recovery using the error recovery table was successful, the disk drive increments a counter associated with the error recovery step which successfully recovered the error, as noted by block 366. The disk drive then adjusts a weight associated with each step, based on the existing error counts for all of the error recovery steps and the new error count for the error recovery step just performed, as indicated by block 370.

When adjusting the weight given to each step, the disk drive looks at the number of occurrences of the error type, and increases the number of attempts the error recovery step is to be given before moving to the next error recovery step in the table. For example, a default weight may give the first step in the error recovery table a five attempt limit on recovering the error, and if that step is not successful in recovering the error within the five attempts, the disk drive moves on to the next step in the error recovery table. If the weight of a step is increased, the disk drive may give that error recovery step an additional attempt.

Using the example above, the disk drive may attempt the first step six times before moving to the next step in the error recovery table. Furthermore, the number of attempts using later steps in the error recovery table may be decreased if relatively few error occurrences are recovered using that particular step. As will be understood by those of skill in the art, the determination of the weighting of the table will be enhanced based on particular drive characteristics.

After adjusting the error recovery table in block 370, the disk drive then reorders the error recovery table based on the revised weights for the steps in the table, as noted by block 374, and the error recovery is completed, as noted by block 378.

In the embodiment of FIG. 7, the table is reordered such that the steps with the highest weights are attempted before steps with lower weights. For example, the error may be an ECC error, which has occurred more than any other error for a particular disk drive. As more and more ECC errors are found and recovered relative to any other single error, the ECC recovery step in the error recovery table will become more heavily weighted, and move up to the top of the error recovery table, if it was not there already. Thus, since the ECC recovery has the highest probability of recovering an error for that specific disk drive, it will be tried first, and more often, than other error recovery steps. Likewise, the error recovery step associated with the error which occurs with the second most frequency will be attempted second, and given additional attempts to recover the error as compared to error recovery steps farther down the error recovery table. The steps towards the end of the table, which are least likely to recover the error, will be tried last, and will be given the fewest number of attempts. In this way, error recovery time each disk drive improves as the drive continues operation.

The error recovery table order, and the weights for each step in the error recovery table, can be stored in the second storage area 38 in a similar manner as described above with respect to the adaptive error recovery technique of FIG. 6. When the error recovery table order, and the weights for each step are stored in the second storage area, they can also be periodically saved to the storage media 14, thus providing the disk drive with a updated error recovery table order and step weight upon powering up. As mentioned above, multiple error recovery table orders may be used, which can also be stored in the second storage area 38, and which can also be saved to the storage media periodically.

As will be understood by those of skill in the art, there is a limited time budget in which to recover an error. For example, a disk drive may have a total of 5 seconds to recover an error. In some cases, not all of the error recovery steps can be attempted before the time budget is expired, thus by weighting the error recovery table, the error recovery steps which are least likely to recover an error are attempted at the end of the recovery routine, allowing for the most likely recovery steps to be attempted during the error recovery time period.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for reducing error recovery time in a hard disk drive, comprising:
   providing an error recovery table having a plurality of error recovery steps arranged in an error recovery step order stored in the hard disk drive;
   detecting a first read error;
   recovering from said first read error using said error recovery table;
   determining a successful error recovery step from said error recovery step order which was successful in recovering said first read error; and
   adjusting said error recovery step order in the hard disk drive based on said determining step.

2. A method, as claimed in claim 1, wherein said adjusting step includes:
   moving said successful error recovery step to the beginning of said error recovery step order when said successful error recovery step is not at the beginning of said error recovery step order.

3. A method, as claimed in claim 1, wherein said adjusting step includes:
recording a first error location, a first error type, and said successful error recovery step in a first memory element; and
performing said successful error recovery step before any other steps in said error recovery step order when a second error is detected which has said first error type and is within a predetermined distance from said first error location.

4. A method, as claimed in claim 3, wherein said predetermined distance is 100 sectors.

5. A method, as claimed in claim 3, wherein said predetermined distance is one track.

6. A method, as claimed in claim 3, wherein said predetermined distance is one disk surface.

7. A method, as claimed in claim 3, further comprising:
performing secondly at least one of the remaining steps in said error recovery table when said successful error recovery step is not successful in recovering said second error.

8. A method, as claimed in claim 3, further comprising:
detecting a third read error;
comparing a third error type and a third error location of said third error to said first error type and first error location; and
performing said successful error recovery step when said first and third error types are similar and when said first and third error locations are within a predetermined distance from each other.

9. A method, as claimed in claim 8, wherein said predetermined distance is 100 sectors.

10. A method, as claimed in claim 8, wherein said predetermined distance is one track.

11. A method, as claimed in claim 8, wherein said predetermined distance is one disk surface.

12. A method, as claimed in claim 8, further comprising:
recovering from said third error using said error recovery table when said first and third error types are not similar or said first and third error locations are not within said predetermined distance; and
recording a third error type, a third error location, and a third error recovery step in a second memory element.

13. A method, as claimed in claim 3, wherein said recording step also includes storing an occurrence count in said first memory element.

14. A method, as claimed in claim 13, further comprising:
detecting a third read error;
comparing a third error type and a third error location of said third read error to said first error type and first error location;
recovering from said third read error using said error recovery table when said third error type is not similar to said first error type; and
recording an error type, an error location, and a recovery step for said third read error in a second memory element.

15. A method, as claimed in claim 1, wherein said adjusting step includes:
determining weight data associated with each error recovery step in said error recovery step order;
modifying said weight data based on said successful error recovery step; and
re-ordering said error recovery step order based on said modified weight data.

16. A method, as claimed in claim 15, wherein said weight data is used to determine a number of attempts each error recovery step will be given.

17. A method, as claimed in claim 15, wherein said modifying step includes:
determining a current weight for said successful error recovery step;
increasing said current weight when said current weight is less than a maximum weight; and
decreasing a weight of a last error recovery step in said error recovery table when said weight is greater than a minimum weight.

18. A method, as claimed in claim 17, wherein said re-ordering step comprises:
determining a current weight for each error recovery step in said error recovery table; and
sorting said error recovery table such that said error recovery steps are ordered according to current weight.

19. A method, as claimed in claim 17, wherein said maximum weight corresponds to eight (8) attempts for an error recovery step, and wherein said minimum weight corresponds to one (1) attempt for an error recovery step.

20. A hard disk drive, comprising:
at least one magnetic storage disk;
a transducer mounted to an actuator arm, said transducer operable to read and write data to said at least one magnetic storage disk;
control electronics operable to actuate said actuator arm and send and receive write and read signals to and from said transducer; and
a memory having a first storage area and a second storage area, said second storage area operable to store at least a first error recovery table having a first plurality of error recovery steps arranged in a first error recovery step order;
wherein said control electronics are operable to detect an error in read data and perform error recovery according to said first error recovery table, and wherein said control electronics are operable to re-order said first error recovery step order based on an error recovery step used to recover from said error.

21. A hard disk drive, as claimed in claim 20, wherein said second storage area is operable to store a second error recovery table having a second plurality of error recovery steps arranged in a second error recovery step order, wherein said first error recovery table is associated with a first disk surface and said second error recovery table is associated with a second disk surface, and
wherein said control electronics are operable to determine if said error is located on said first or second disk surface and perform error recovery using said first error recovery table when said error is located on said first disk surface and using said second error recovery table when said error is located on said second disk surface.

22. A hard disk drive, as claimed in claim 21, wherein said second storage area is operable to store a plurality of error recovery tables, each of said plurality of error recovery tables being associated with a data zone and having a plurality of error recovery steps arranged in respective error recovery step orders, and
wherein said control electronics are operable to determine a data zone for said error and perform error recovery using the error recovery table associated with said data zone for said error.

23. A hard disk drive, as claimed in claim 22, wherein each disk surface has sixteen (16) data zones.

24. A hard disk drive, as claimed in claim 21, wherein said control electronics are operable to re-order said second error recovery step order based on an error recovery step which was successful in recovering said error.

25. A hard disk drive, as claimed in claim 20, wherein said second storage area also includes weighting data, said weighting data indicating a number of attempts each error recovery step in said error recovery table will be given.

26. A method for recovering from a read error in a hard disk drive, comprising:
   detecting a first read error;
   performing a recovery of said first read error using a predetermined order of error recovery steps; and
   adjusting said predetermined order of error recovery steps to create a modified order of error recovery steps when said first read error is recovered, wherein said adjusting step comprises:
      determining firstly a successful error recovery step;
      determining secondly weight data associated with each of said error recovery steps;
      modifying said weight data based on said successful error recovery step; and
      re-ordering said order of error recovery steps based on said modified weight data.

27. A method, as claimed in claim 26, wherein said weight data is used to determine a number of attempts each error recovery step will be given.

28. A method, as claimed in claim 26, wherein said modifying step includes:
   determining a current weight for said successful error recovery step;
   increasing said current weight when said current weight is less than a maximum weight; and
   decreasing a weight of a last error recovery step in said order of error recovery steps when said weight is greater than a minimum weight.

29. A method, as claimed in claim 28, wherein said re-ordering step comprises:
   determining a current weight for each error recovery step in said order of error recovery steps; and
   sorting said order of error recovery steps such that said error recovery steps are ordered according to current weight.

30. A method, as claimed in claim 29, wherein said maximum weight corresponds to eight (8) attempts for an error recovery step, and wherein said minimum weight corresponds to one (1) attempt for an error recovery step.

31. A method, for recovering from a read error in a hard disk drive, comprising:
   detecting a first read error;
   performing a recovery of said first read error using a predetermined order of error recovery steps; and
   adjusting said predetermined order of error recovery steps to create a modified order of error recovery steps when said first read error is recovered, wherein said adjusting step comprises:
      determining a successful error recovery step; and
      moving said successful error recovery step to the beginning of said predetermined order of error recovery steps.

32. A method for recovering a read error in a hard disk drive, comprising:
   detecting a read error;
   determining if an error memory element contains an entry for an error having an error type and an error location corresponding to said read error;
   performing a first error recovery step associated with said error memory element when said error memory element contains an entry for an error having an error type and an error location corresponding to said read error; and
   performing an error recovery based on an error recovery table when said first error recovery step is not successful in recovering said read error, wherein said first error recovery step is omitted from said error recovery table; and
   performing an error recovery based on said error recovery table when read error does not correspond to said error type and said error location of an error memory element.

33. A method, as claimed in claim 32, further comprising:
   storing an error location and an error type of said read error in an error memory element when said first error recovery step is not successful in recovering said read error.

34. A method, as claimed in claim 33, further comprising:
   setting an occurrence count in said error memory element to one.

35. A method, as claimed in claim 34, further comprising:
   incrementing an occurrence count in said error memory element when said first error recovery step is successful in recovering said read error.

36. A method, as claimed in claim 35, further comprising:
   detecting a second read error;
   recovering from said second read error using an error recovery table when a location and error type of said second error do not correspond to an error memory element; and
   storing a recovery step, an error type, and an error location for said second read error in an error memory element having the lowest occurrence count.

37. A method, as claimed in claim 32, further comprising:
   resetting an age data element in said error memory element.

38. A method, as claimed in claim 37, further comprising:
   resetting an age data element in said error memory element when said first error recovery step is successful in recovering said read error.

39. A method, as claimed in claim 38, further comprising:
   detecting a second read error;
   recovering from said second read error using an error recovery table when a location and error type of said second error do not correspond to an error memory element; and
   storing a recovery step, an error type, and an error location for said second read error in an error memory element having the oldest age data element.

* * * * *